July 16, 1940.  W. A. ARNESEN ET AL  2,208,240
DEPTH FINDER AND FISHING BOBBER
Filed June 28, 1939
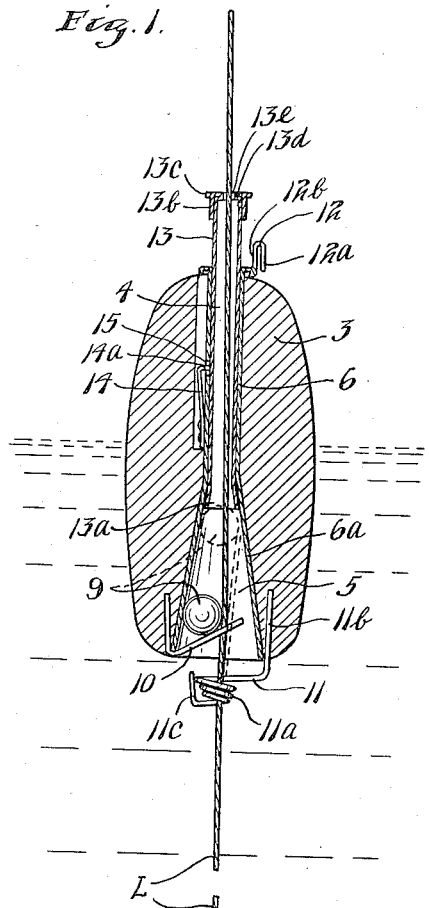
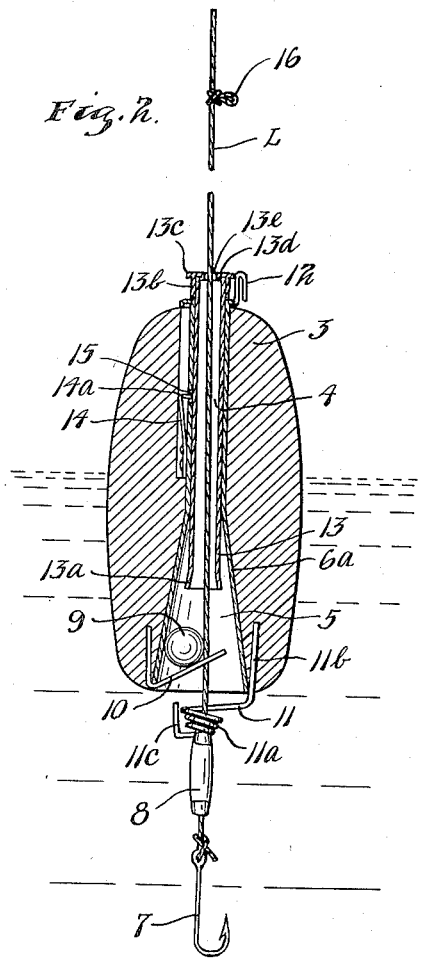
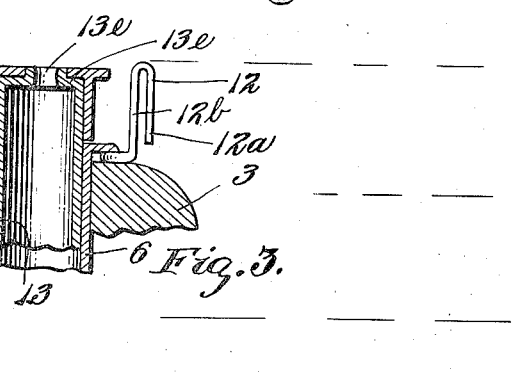
INVENTORS.
WILLIAM A. ARNESEN.
OVE H. ARNESEN.
BY THEIR ATTORNEYS.
Williamson & Williamson Patented July 16, 1940

2,208,240

UNITED STATES PATENT OFFICE 2,208,240

DEPTH FINDER AND FISHING BOBBER

William A. Arnesen and Ove H. Arnesen, St. Paul, Minn.

Application June 28, 1939, Serial No. 281,542

7 Claims. (Cl. 43—49)

Our invention relates to fishing bobbers and particularly to a bobber which also constitutes a depth finder.

In fishing with a bobber-equipped line it is usually desirable to set the bobber on the line at such a distance from the hook or bait that the hook or bait will be disposed at some preferred distance above the bottom of the body of water in which the fishing is being done. Such setting of the bobber is, of course, dependent upon a knowledge of the depth of the body of water at the location therein where the fishing is being carried on and determination of the depth is usually relatively difficult and time-consuming with the means ordinarily at hand.

An object of our invention is to provide a device which is usable as a depth finder, a still fishing bobber, or a casting bobber.

A more specific object is to provide such a device consisting of a bobber through which a fishing line may be extended and including manually releasable means for restraining a line from moving upwardly through the bobber and yet permitting the line to move downwardly through the bobber.

Another object is to provide such a device including means enabling positive anchoring of a line thereto.

A further object is to provide such a device of simple, light, compact, easily operable, relatively troubleproof and inexpensive construction.

These and other objects of the invention will more fully appear from the following description made in connection with the accompanying drawing, wherein like reference characters refer to the same parts throughout the views, and, in which:

Fig. 1 is a vertical sectional view of an embodiment of our invention shown in operative association with a fishing line and set for use as a depth finding device;

Fig. 2 is a vertical sectional view similar to Fig. 1 with the exception that the device is set for use as a casting bobber; and Fig. 3 is a detailed vertical sectional view of the upper portion of the device drawn to enlarged scale.

Referring to the drawing the embodiment of our device shown therein includes a bobber body 3 which is formed of any suitable material which is buoyant in water and which may be shaped similarly to any suitable conventional type of bobber. The body 3 is vertically apertured to form in the upper portion thereof a vertically extending relatively small aperture 4, and in the lower portion thereof a generally conical open bottomed chamber 5. The body is preferably provided with a tubular lining 6 which is increased in diameter in its lower portion 6a to match the shape of the chamber 5.

The vertically extending aperture including the relatively small portion 4 and the conical portion 5 is adapted for extension of a fishing line such as the line L shown in the drawings therethrough. The line L is shown as having attached to the lower portion thereof a fish hook 7 and a sinker 8.

Means is provided within the body 3 for restraining the line L from upward movement through the body 3 and yet permitting downward movement of the line L through the body 3. For this purpose we provide an element 9 preferably spherical in form which is disposed in the conical chamber 5 with freedom for movement therein. To prevent loss of the spherical element 9 through the open lower end of the device an element 10 is provided which may consist of a piece of wire bent as shown in the drawings and having a portion secured in a suitable aperture in the body 3. The remaining portion of the wire 10 extends across the open lower end of the conical chamber 5 in such manner as to substantially intersect the vertical axis of the body 3.

The spherical element 9 in combination with portions of the device defining the conical chamber 5 functions when the device is used as a depth finder to restrict upward movement of the line L through the device. The line L with the device associated therewith as shown in the drawing may be thrown into the water whereupon the weight of the sinker 8 and hook 7 will pull the line L downwardly through the device. When the user notes that the hook 7 and sinker 8 have reached the bottom of the body of water into which the line has been thrown, he may then pull in on the line. An initial movement of the line L upwardly through the device while the line is in engagement with the spherical element 9 will roll the spherical element 9 upwardly to the position thereon indicated in dotted lines in Fig. 1, whereupon the line L will be wedged between the spherical element 9 and the upper portion of the conical part 6a of the lining 6. The line will thus be prevented from further upward movement relative to the body 3, and the body 3 will be pulled in with the line. The distance from the body 3 to the hook 7 will then indicate the approximate depth of the body of water.

To maintain the line L in centered relationship with the lower end of the body 3 so that the line L will be certain to engage the spherical element 9 for rolling the same upwardly, a guide 11 is provided. The guide 11 includes an eye 11a which is centered relative to the open bottom end of the body 3 and through which the line L is normally extended. The guide 11 may be formed of wire bent in a helix as shown to form the eye 11a. One end 11b of the wire 11 may be secured in a suitable aperture in the body 3. The opposite end 11c beyond the helix forming the eye 11a may be bent upwardly to lie closely against the helix so as to form means for positively anchoring the line L to the bobber when it is desired to use the bobber in the manner in which bobbers are used in ordinary still fishing.

Another means for anchoring the line L to the bobber may be provided or not as desired. This means consists of a piece of wire 12 bent around and secured to the upper end of the tubular lining 6 and having a free end portion 12a bent to lie parallel to a portion 12b of the wire 12 lying closer to the lining 6 and projecting vertically therefrom. The line L may be wedged between the portions 12a and 12b of the wire element 12 for the purpose of positively anchoring the line L to the bobber body 6 for use of the bobber in still fishing.

When the depth of the body of water has been determined as previously explained, the line L may be manually pulled upwardly through the body 3 through a distance corresponding to the distance above the bottom of the body of water at which it is desired that the hook 7 will be disposed when my device is used as a bobber. The line, at a point thereon adjacent the upper end of the device, may then be wedged between the outer and inner parallel portions 12a and 12b of the resilient element 12 to anchor my device to the line for use of my device as a bobber.

Means is provided for rendering the combination of the spherical element 9 and the portions of the body 3 defining the conical chamber 5 inoperative for controlling movement of the line L through the bobber body 3. For this purpose a tubular member 13 is snugly telescoped within the upper portion of the tubular element 6. The tubular element 13 is flared slightly at its lower end 13a to prevent undesired withdrawal of the tubular element 13 from telescoped relation with the lining 6. The upper end of the tubular member 13 is provided with a cap 13b carrying a flange 13c which serves as a finger piece by means of which the tubular element 13 may be manipulated. The upper end of the tubular member 13 is provided with a closure 13d having therein a central aperture 13e slightly larger in diameter than an ordinary fishing line. The distance from the flared lower end of the tubular member 13 to the cap 13b is such as to permit vertical movement of the member 13 for projecting the lower end 13a thereof into the conical chamber 5 and retracting the lower end 13a from the conical chamber 5. When the tubular member 13 is in its uppermost position as illustrated in Fig. 1 the spherical element 9 is free to move into the uppermost portion of the chamber 5 so as to wedge itself and the line L into the upper portion of the chamber 5. When the member 13 is pushed to its lower limit of movement as illustrated in Fig. 2, the lower portion 13a of the tubular member 13 functions as means for preventing the spherical element 9 from movement upward sufficiently to enter into wedging relationship with the line L and the lower portion 6a of the lining 6.

Frictional means is provided for yieldingly retaining the tubular member 13 in either of the positions thereof shown in Figs. 1 and 2. For this purpose a flat spring 14 is secured at one end thereof to the exterior of the upper portion of the tubular lining 6. The free end 14a of the spring 14 is bent inwardly and projects through an aperture 15 in the lining 6 so as to be in spring pressed frictional engagement with the exterior of the tubular member 13.

With the tubular member 13 pushed to its lower limit of movement as illustrated in Fig. 2, the line L is free to move either upwardly or downwardly through the body 3 and the bobber may then be used as a casting bobber in which case a knot such as the knot 16 shown in Fig. 2 may be formed on the line L in a suitable location to determine the height above the bottom of the body of water at which the hook 7 will be disposed. When the line L is cast out, the bobber body 3 will be immediately adjacent the sinker 8 as indicated in Fig. 2. When the cast has been completed the line L will move downwardly through the bobber body responsive to the weight of the sinker 8 and hook 7 until the knot 16 has engaged the top closure 13d of the tubular member 13. Placing the tubular member 13 in the lower portion thereof illustrated in Fig. 2 also enables upward movement of the line L through the bobber for adjusting the position of the bobber on the line when the line L and the bobber are to be used for still fishing.

From the above it should be clear that the illustrated device is equally capable of use as a depth finder, as a bobber for still fishing, and as a casting bobber.

It is apparent that we have invented a novel, simple, compact, easily used, and inexpensive form of combined depth finder and fishing bobber.

It will, of course, be understood that various changes may be made in the form, arrangement, proportions and details of the various parts without departing from the scope of our invention.

What is claimed is:

1. A combination fishing bobber and depth finder including, a bobber body formed of material buoyant in water, said body having a vertical aperture therethrough for accommodation of a fishing line, said aperture being enlarged at one portion thereof to form a chamber of entirely downwardly divergent generally conical shape, and a generally spherical element contained in said chamber and having a diameter exceeding the minimum diameter of said aperture.

2. A combination fishing bobber and depth finder including, a bobber body formed of material buoyant in water, said body having therethrough a vertical aperture for extension of a fishing line therethrough, said aperture having one enlarged portion entirely of downwardly divergent tapered shape, a generally spherical element of a diameter intermediate the minimum and maximum diameter of the tapered portion of said aperture contained within the tapered portion of said aperture with freedom for movement therein, and means blocking exit of said spherical element from the lower end of said aperture.

3. A combination fishing bobber and depth finder including, a bobber body of material buoyant in water, said body having a vertical aperture therein for extension of a fishing line therethrough enlarged in one portion to form an entirely downwardly divergent generally conical chamber, a generally spherical element of a diameter exceeding the minimum diameter and not appreciably exceeding the maximum radius of said chamber contained in said chamber, and means on said body for detachably anchoring a fishing line thereto.

4. A combination fishing bobber and depth finder including, a bobber body of material buoyant in water, said body having therein a vertical aperture for extension of a fishing line therethrough, said aperture, at least in its lower portion, being enlarged to form an open-bottomed downwardly divergent generally conical chamber, a generally spherical element contained within said chamber with freedom for movement therewithin, and means at the lower end of said chamber for maintaining a line associated with said bobber centered at and relative to the lower end of said chamber with freedom for vertical movement through said chamber.

5. A combination fishing bobber and depth finder including, a bobber body of material buoyant in water, said body having therein a vertical aperture for extension of a fishing line therethrough, said aperture, at least in its lower portion, being enlarged to form an open-bottomed downwardly divergent generally conical chamber, a generally spherical element contained within said chamber with freedom for movement therewithin, a line-guiding eye element associated with and substantially centered relative to the lower end of said chamber, and means supporting said eye element from said body.

6. A combination fishing bobber and depth finder including, a bobber body formed of material buoyant in water, said body having therethrough a vertical aperture for accommodating a fishing line, said aperture having a downwardly divergent taper, a spherical element of a diameter intermediate the maximum and minimum diameters of said aperture contained in the lower portion of said aperture, means restraining said spherical element from downward exit from said aperture, and means shiftable into and out of a position wherein said shiftable means restrains said spherical element from movement to the normal upward limit of movement thereof.

7. A combination fishing bobber and depth finder including, a bobber body formed of material buoyant in water, said body having therethrough a vertical aperture for accommodating a fishing line, said aperture, from the medial portion thereof being downwardly divergently tapered to form an open-bottomed generally conical chamber, a spherical element of a diameter intermediate the maximum and minimum diameters of said chamber contained in said chamber with freedom for movement therein, means blocking exit of said spherical element from the lower end of said chamber, and a tubular element adapted for extension of said line therethrough telescoped into the upper portion of said aperture in frictionally slidable relation with said body, the upper end of said tubular element projecting above said body for use as an operating element in vertically sliding said tubular element between respective positions thereof wherein the lower end thereof is respectively projected into and retracted substantially out of said chamber whereby said tubular element, when in downwardly projected position, will restrain said spherical element from shifting to its normal upper limit of movement.

WILLIAM A. ARNESEN.
OVE H. ARNESEN.